United States Patent
Takada et al.

(10) Patent No.: US 9,816,706 B2
(45) Date of Patent: Nov. 14, 2017

(54) FUEL CELL COMBUSTOR AND FUEL CELL MODULE

(71) Applicant: HONDA MOTOR CO., LTD., Tokyo (JP)

(72) Inventors: Hideaki Takada, Wako (JP); Tetsuya Ogawa, Wako (JP); Teruyuki Ushijima, Wako (JP); Yukihiko Kiyohiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 14/973,948

(22) Filed: Dec. 18, 2015

(65) Prior Publication Data
US 2016/0181638 A1    Jun. 23, 2016

(30) Foreign Application Priority Data

Dec. 22, 2014 (JP) ................ 2014-258864

(51) Int. Cl.
| | |
|---|---|
| *H01M 8/06* | (2016.01) |
| *H01M 8/10* | (2016.01) |
| *H01M 8/04* | (2016.01) |
| *F23K 5/00* | (2006.01) |
| *F23D 14/02* | (2006.01) |
| *F23D 99/00* | (2010.01) |
| *H01M 8/0612* | (2016.01) |
| *H01M 8/04014* | (2016.01) |
| *H01M 8/124* | (2016.01) |

(52) U.S. Cl.
CPC ............. *F23K 5/002* (2013.01); *F23D 14/02* (2013.01); *F23D 91/00* (2015.07); *H01M 8/04022* (2013.01); *H01M 8/0625* (2013.01); *H01M 2008/1293* (2013.01); *H01M 2250/20* (2013.01); *Y02E 60/525* (2013.01); *Y02T 90/32* (2013.01)

(58) Field of Classification Search
CPC .... H01M 8/06; H01M 8/0606; H01M 8/0618; H01M 8/0625
See application file for complete search history.

(56) References Cited

U.S. PATENT DOCUMENTS 7,666,236 B2 * 2/2010 Tamura ................. B01J 8/0278
                                                                422/198

FOREIGN PATENT DOCUMENTS

JP          2011-113890          6/2011

* cited by examiner

*Primary Examiner* — Ula C Ruddock
*Assistant Examiner* — Julian Anthony
(74) *Attorney, Agent, or Firm* — Rankin, Hill & Clark LLP

(57) ABSTRACT

A raw fuel inlet pipe, an air inlet pipe, and a combustion gas exhaust pipe are provided for a casing of a start-up combustor. A raw fuel supply chamber connected to the raw fuel inlet pipe and an air supply chamber connected to the air inlet pipe form double layer structure. A chamber having a partition wall is provided for the raw fuel supply chamber, and a slit connected to the air supply chamber is formed in the partition wall. A plurality of raw fuel through holes are formed on a side surface of the partition wall with which the slit is formed.

7 Claims, 6 Drawing Sheets

FUEL CELL COMBUSTOR AND FUEL CELL MODULE

CROSS-REFERENCE TO RELATED APPLICATION

This application is based upon and claims the benefit of priority from Japanese Patent Application No. 2014-258864 filed on Dec. 22, 2014, the contents of which are incorporated herein by reference.

BACKGROUND OF THE INVENTION

Field of the Invention

The present invention relates to a fuel cell combustor for supplying a combustion gas to a fuel cell stack formed by stacking a plurality of fuel cells for generating electrical energy by electrochemical reactions of a fuel gas and an oxygen-containing gas. Further, the present invention relates to a fuel cell module including the combustor and the fuel cell stack.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (hereinafter also referred to as the MEA). The electrolyte electrode assembly is sandwiched between separators (bipolar plates). In use, generally, predetermined numbers of the electrolyte electrode assemblies and the separators are stacked together to form a fuel cell stack.

In the SOFC, since the operating temperature is relatively high, it is required to raise the temperature of the stacked fuel cells to the desired temperature beforehand. As a known technique of raising the temperature in such a situation, for example, Japanese Laid-Open Patent Publication No. 2011-113890 discloses an off gas combustion apparatus and an off gas combustion method for a solid oxide fuel cell.

This off gas combustion apparatus includes a mixture suppression region and a mixture promotion region. The mixture suppression region consists of partition plates each extending, so as not to mix at an early stage, a fuel electrode off gas and an air electrode off gas discharged from a tip of a fuel cell bundle. The mixture promotion region has a hole formed at an upper position of the partition plates to promote mixing of the fuel electrode off gas and the air electrode off gas at a latter stage.

According to the disclosure, it is possible to suppress mixing of the fuel electrode off gas and the air electrode off gas at the tip end of the solid oxide fuel cell bundle.

Therefore, according to the disclosure, by placing the position heated in combustion to be remote from the tip end of the fuel cell bundle to reduce the heat distribution difference in the fuel cell bundle, it becomes possible to prolong the service life of the fuel cell bundle.

SUMMARY OF THE INVENTION

In Japanese Laid-Open Patent Publication No. 2011-113890, the mixture suppression region for suppressing mixture is formed adjacent to the tip end of the fuel cell bundle, and the mixture promotion region for promoting mixture is formed remotely from the tip end of the fuel cell bundle. Therefore, the overall size of the off gas combustion apparatus becomes considerably large, and the structure is complicated.

The present invention has been made to solve the problem of this type, and an object of the present invention is to provide a fuel cell combustor and a fuel cell module having compact structure in which it is possible to promptly and reliably obtain a stable combustion gas.

The present invention relates to a fuel cell combustor configured to supply a combustion gas produced by mixing a fuel gas and an oxygen-containing gas, to a fuel cell stack including a plurality of stacked fuel cells configured to generate electrical energy by electrochemical reactions of the fuel gas and the oxygen-containing gas.

Further, the present invention relates to a fuel cell module including the fuel cell stack and the combustor.

The combustor includes a casing, and the casing has a fuel gas inlet configured to flow the fuel gas into the casing through the fuel gas inlet, an oxygen-containing gas inlet configured to flow the oxygen-containing gas into the casing through oxygen-containing gas inlet, and a combustion gas outlet configured to discharge the combustion gas from the casing through the combustion gas outlet. A fuel gas supply unit is connected to the fuel gas inlet, and is configured to fill the fuel gas in the fuel gas supply unit. An oxygen-containing gas supply unit is connected to the oxygen-containing gas inlet, and is configured to fill the oxygen-containing gas in the oxygen-containing gas supply unit. The fuel gas supply unit and the oxygen-containing gas supply unit form double layer structure.

The fuel gas supply unit is a chamber having a partition wall. A slit connected to the oxygen-containing gas supply unit is formed in the partition wall. A plurality of fuel gas through holes are formed on a side surface of the partition wall with which the slit is formed, the fuel gas through holes are configured to pass the fuel gas from the chamber to the slit, and the fuel gas through holes are arranged in a direction in which the slit extends. The oxygen-containing gas flows through the oxygen-containing gas inlet, the oxygen-containing gas supply unit, and the slit, and the oxygen-containing gas is mixed with the fuel gas.

In the present invention, the oxygen-containing gas flows from the oxygen-containing gas inlet to the slit through the oxygen-containing gas supply unit, and the fuel gas flows from the fuel gas inlet to the slit through the fuel gas supply unit and the fuel gas through holes. In this manner, the oxygen-containing gas and the fuel gas can be guided reliably to the slit as the desired combustion position. Therefore, with the compact structure, it becomes possible to promptly and reliably obtain the stable combustion gas.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
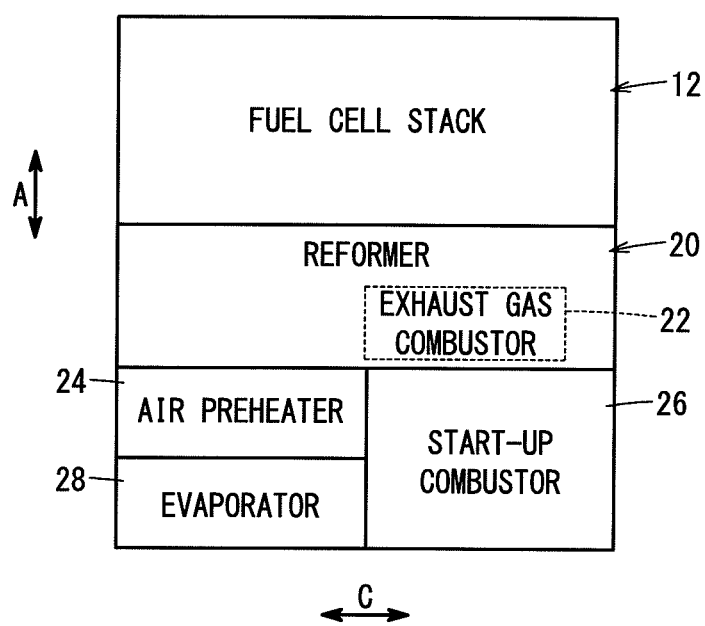
FIG. 1 is a diagram showing structure of a fuel cell module according to an embodiment of the present invention.
Figure 2:
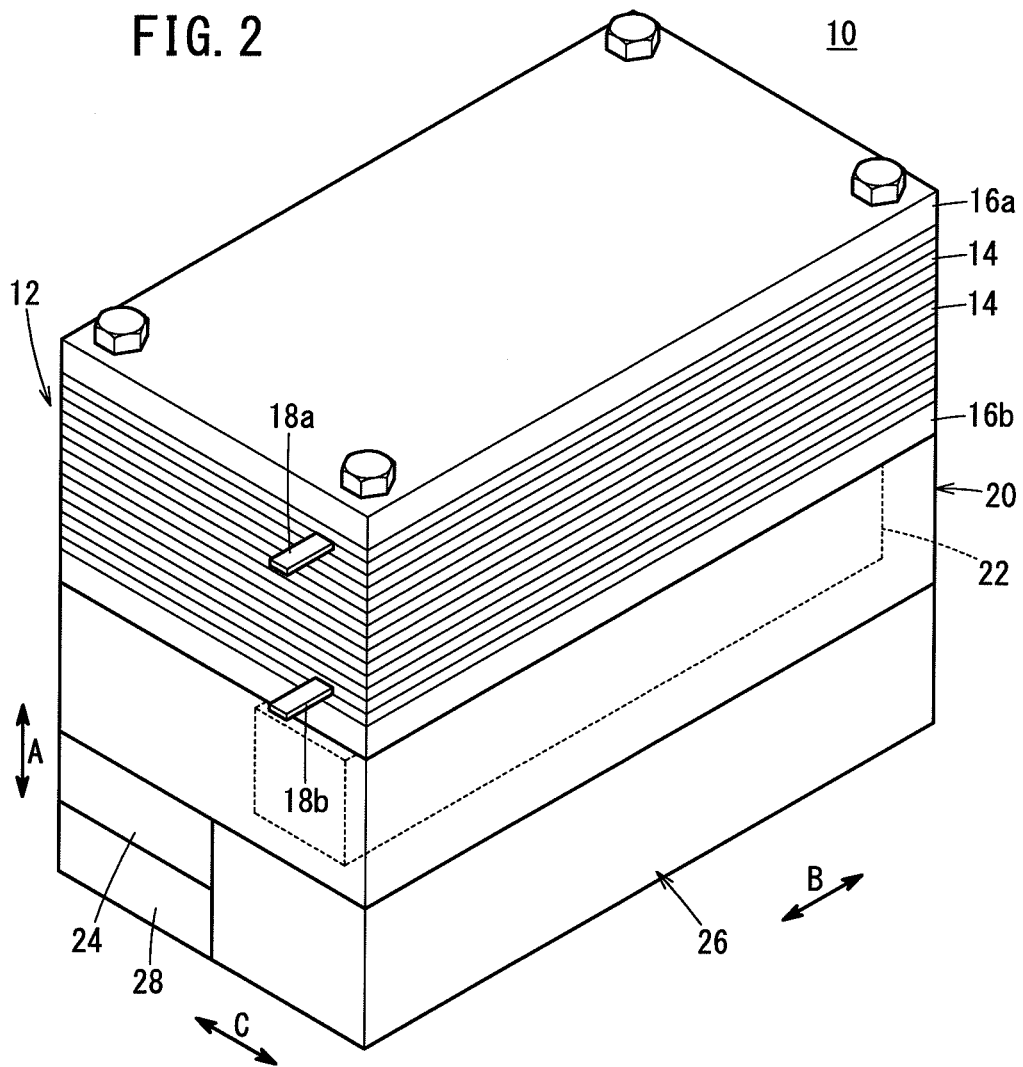
FIG. 2 is a perspective view schematically showing the fuel cell module.

A fuel cell module 10 according to an embodiment of the present invention shown in FIGS. 1 and 2 may be used in a stationary application. Additionally, the fuel cell module 10 may be used in various applications. For example, the fuel cell module 10 may be mounted in a vehicle. The fuel cell module 10 includes a fuel cell stack 12 for generating electrical energy by electrochemical reactions of a fuel gas (mixed gas of a hydrogen gas, methane, and carbon monoxide) and an oxygen-containing gas (air).

As shown in FIG. 2, the fuel cell stack 12 includes a plurality of flat plate shaped solid oxide fuel cells 14. The fuel cells 14 are stacked together in a vertical direction indicated by an arrow A (or in a horizontal direction). At both ends of the fuel cells 14 in the stacking direction, end plates 16a, 16b are provided to apply a tightening load to the fuel cells 14 in the stacking direction. At both ends of the fuel cells 14 in the stacking direction, output terminals 18a, 18b are provided to supply electrical energy to the outside.

For example, each of the fuel cells 14 includes an electrolyte electrode assembly (MEA). The electrolyte electrode assembly includes a cathode, an anode, and an electrolyte interposed between the cathode and the anode. The electrolyte is an ion oxide conductor made of, e.g., stabilized zirconia. The electrolyte electrode assembly is sandwiched between a cathode separator and an anode separator. An oxygen-containing gas flow field for supplying an oxygen-containing gas to the cathode is formed in the cathode separator, and a fuel gas flow field for supplying a fuel gas to the anode is formed in the anode separator.

As shown in FIGS. 1 and 2, the fuel cell module 10 includes a reformer 20 provided adjacent to the fuel cell stack 12, and an exhaust gas combustor 22 provided inside the reformer 20. The reformer 20 reforms a mixed gas of water vapor and a raw fuel (e.g., city gas) chiefly containing hydrocarbon, and produces the fuel gas supplied to the fuel cell stack 12. The exhaust gas combustor 22 combusts the fuel gas discharged from the fuel cell stack 12 as a fuel exhaust gas and the oxygen-containing gas discharged from the fuel cell stack 12 as an oxygen-containing exhaust gas to produce a combustion gas.

An air preheater 24 and a start-up combustor (combustor according to the present invention) 26 are provided adjacent to the reformer 20, oppositely to the fuel cell stack 12. An evaporator 28 is stacked on the air preheater 24. The air preheater 24 heats the oxygen-containing gas by heat exchange with the combustion gas, and supplies the oxygen-containing gas to the fuel cell stack 12. The start-up combustor 26 combusts the raw fuel (fuel gas) and the oxygen-containing gas to produce the combustion gas. The evaporator 28 evaporates water, and supplies the water vapor to the reformer 20.

Figure 3:
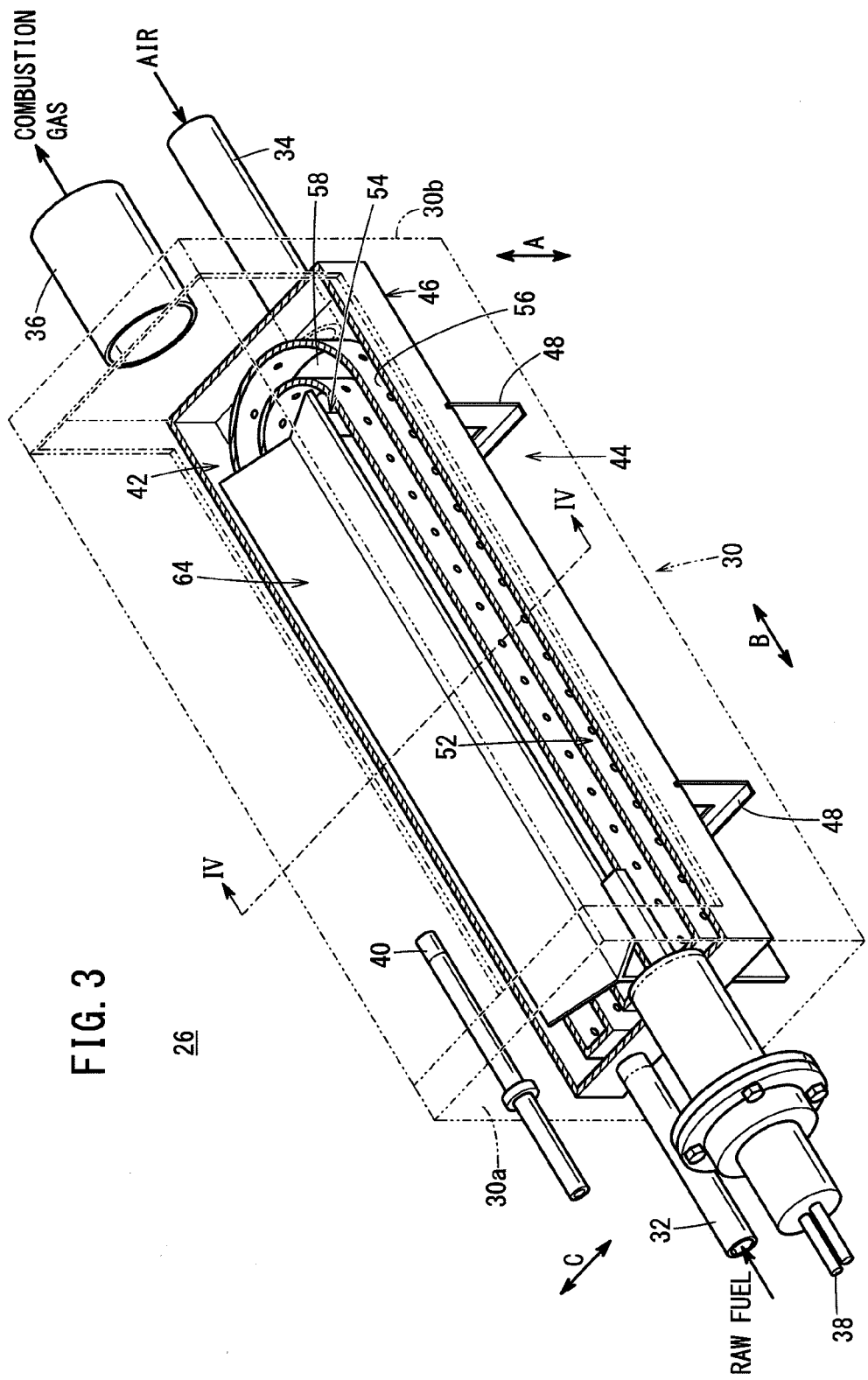
FIG. 3 is a perspective view showing main components of a start-up combustor of the fuel cell module.

As shown in FIG. 3, the start-up combustor 26 has a rectangular parallelepiped casing 30. A raw fuel inlet pipe (fuel gas inlet) 32 is provided at one end surface 30a of the casing 30 in a longitudinal direction indicated by an arrow B, for supplying the raw fuel into the start-up combustor 26 through the raw fuel inlet pipe 32. An air inlet pipe (oxygen-containing gas inlet) 34 is provided at another end surface 30b of the casing 30 in the longitudinal direction, for supplying the oxygen-containing gas into the start-up combustor 26 through the air inlet pipe 34, and a combustion gas exhaust pipe (combustion gas outlet) 36 is provided at the other end surface 30b, for discharging the combustion gas from the start-up combustor 26 through the combustion gas exhaust pipe 36. The combustion gas exhaust pipe 36 is connected to a combustion gas pipe (not shown) of the air preheater 24, and also connected to a heating line (not shown) of the reformer 20.

A glow plug 38 for igniting a mixed gas of the raw fuel and the oxygen-containing gas, and a flame-out sensor 40 for detecting a flame-out (misfire) are attached to the one end surface 30a of the casing 30. The glow plug 38 is provided above a first straight slit 58a described later, and the raw fuel inlet pipe 32 is provided closely to a second straight slit 58b described later.

Figure 4:
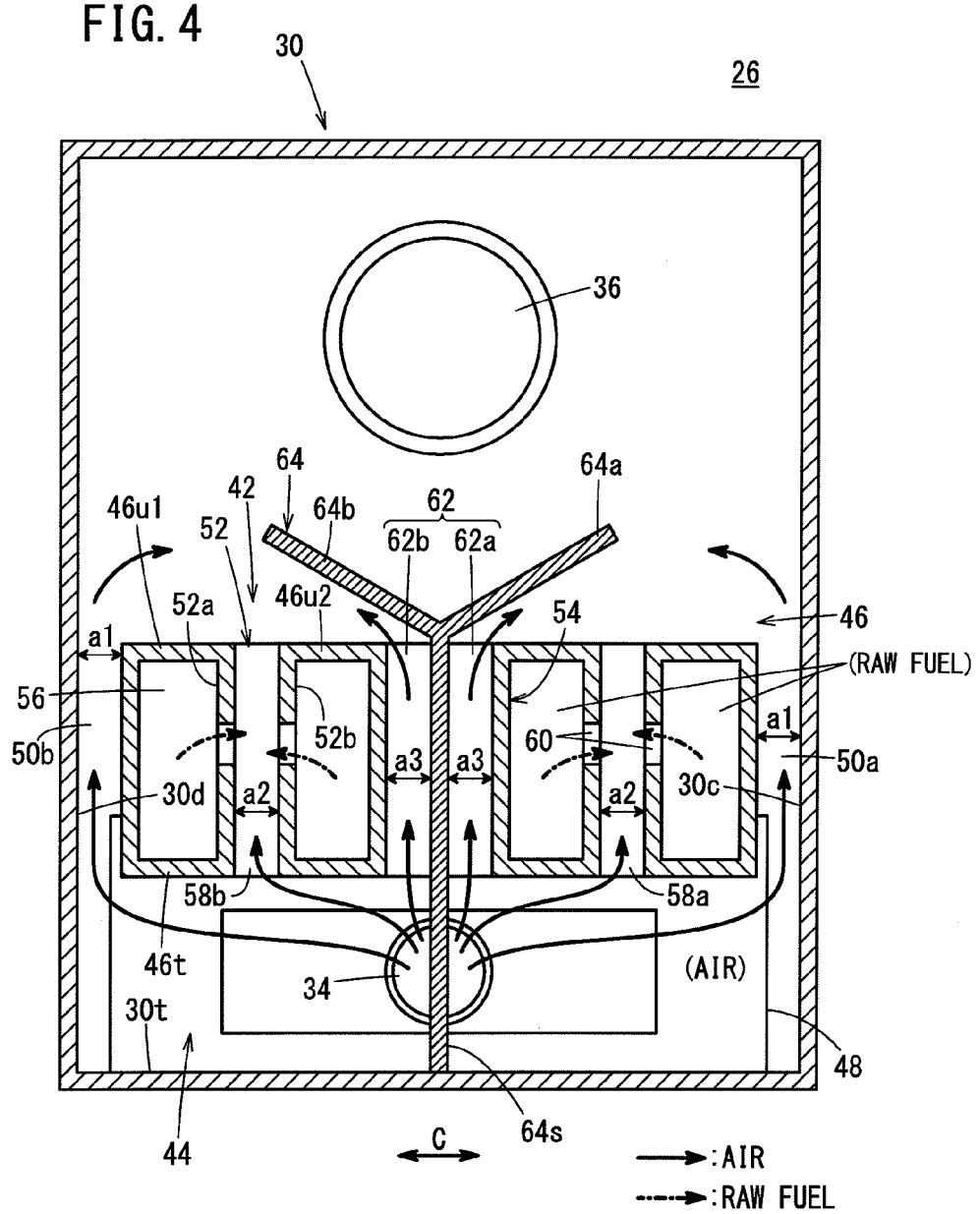
FIG. 4 is a cross sectional view showing the start-up combustor, taken along a line IV-IV in FIG. 3.

As shown in FIGS. 3 and 4, a raw fuel supply chamber (fuel gas supply unit) 42 connected to the raw fuel inlet pipe 32 and an air supply chamber (oxygen-containing gas supply unit) 44 connected to the air inlet pipe 34 are provided in the casing 30. The raw fuel is filled in the raw fuel supply chamber 42, and the air is filled in the air supply chamber 44. The raw fuel supply chamber 42 and the air supply chamber 44 form double layer structure. In the embodiment of the present invention, the air supply chamber 44 is provided below the raw fuel supply chamber 42. The raw fuel supply chamber 42 and the air supply chamber 44 may be arranged in a horizontal direction, or may be arranged in an oblique direction.

The raw fuel supply chamber 42 has a casing member 46 provided in the casing 30. The casing member 46 has a rectangular parallelepiped shape elongated in the direction indicated by the arrow B. A pair of holder plates 48 are fixed to one surface, e.g., a bottom surface 46t of the casing member 46 for holding the casing member 46 in a state where the bottom surface 46t is spaced from a bottom surface (another inner wall surface) 30t of the casing 30 (see FIG. 4).

Figure 5:
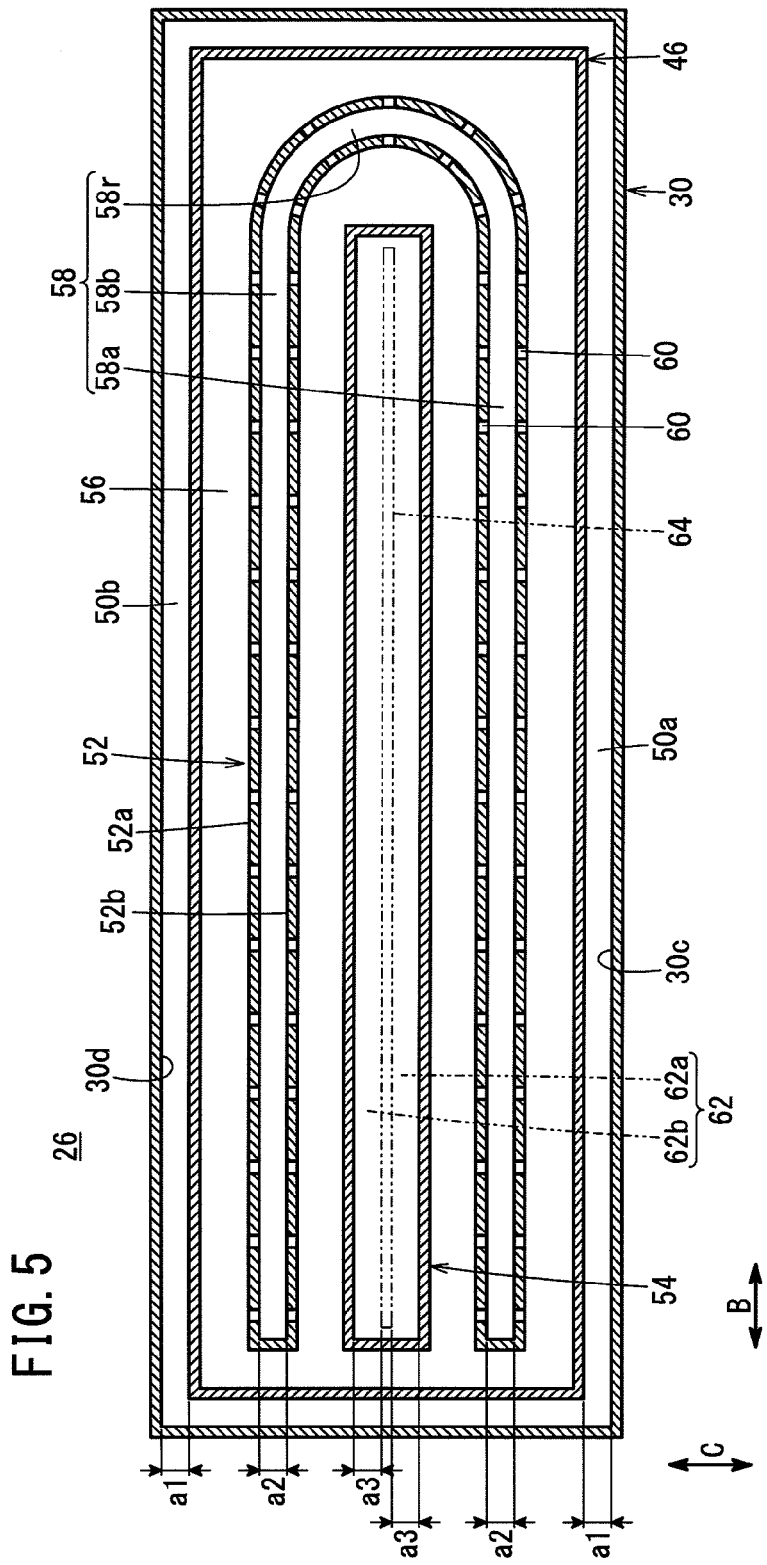
FIG. 5 is a plan view showing the start-up combustor.

The casing member 46 is spaced from (provided above) the bottom surface 30t of the casing 30 to form the air supply chamber 44 between the bottom surface 46t of the casing member 46 and the bottom surface 30t of the casing 30. As shown in FIGS. 4 and 5, the casing member 46 is provided between inner wall surfaces 30c, 30d of the casing 30 with gaps 50a, 50b.

As shown in FIGS. 3 and 4, the casing member 46 forms a chamber 56 having a partition wall 52 and a partition central wall 54. The partition wall 52 has a U-shape including a turning segment at one end in the direction indicated by the arrow B and straight segments extending in parallel in the direction indicated by the arrow B. In the illustrated embodiment, though the partition wall 52 includes one turning segment, the present invention is not limited in this respect. For example, the partition wall 52 may include two or more turning segments.

A slit 58 connected to the air supply chamber 44 passes through the partition wall 52 in the vertical direction indicated by the arrow A. As shown in FIG. 5, the slit 58 includes the first straight slit 58a, the second straight slit 58b, and one turning segment 58r. For example, the partition wall 52 is formed by two plate members fixed to the bottom surface 46t of the casing member 46. Both ends of the two plate members in the longitudinal direction are fixed together to form the U-shape slit 58.

Figure 6:
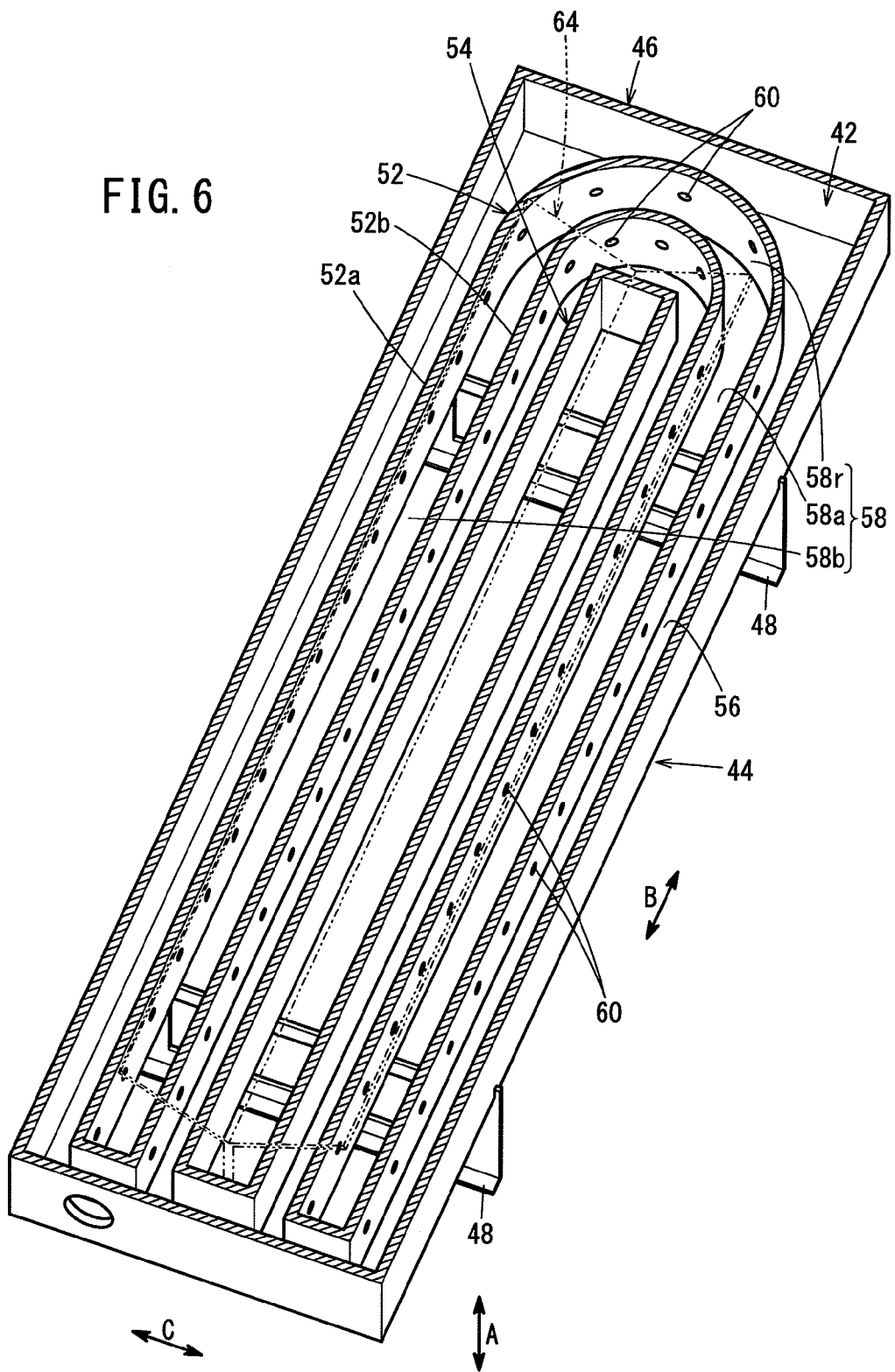
FIG. 6 is a perspective view schematically showing a raw fuel supply chamber and an air supply chamber of the start-up combustor.

As shown in FIGS. 5 and 6, a plurality of raw fuel through holes (fuel gas through holes) 60 are formed in both side surfaces 52a, 52b of the partition wall 52 for allowing the raw fuel to pass from the chamber 56 to the slit 58. The raw fuel through holes 60 are arranged in the direction in which the slit 58 extends. The raw fuel through holes 60 are formed on both sides of the turning segment 58r oppositely, on both sides of the first straight slit 58a oppositely, and on both sides of the second straight slit 58b oppositely. The air flows through the air inlet pipe 34, the air supply chamber 44, and the slit 58, and then, the air is mixed with the raw fuel.

The partition central wall 54 is provided at the center of the casing member 46 in the width direction indicated by an arrow C, and extends in the direction indicated by the arrow B. A central straight slit 62 connected to the air supply chamber 44 passes through the partition central wall 54 in the vertical direction indicated by the arrow A. The central straight slit 62 is provided at an intermediation position between the first straight slit 58a and the second straight slit 58b, and extends straight in parallel with the first straight slit 58a and the second straight slit 58b.

As shown in FIG. 4, an upper plate 46u1 is provided at an upper position of the casing member 46. The upper plate 46u1 is fixed to outer walls of the casing member 46 and outer side surfaces 52a of the partition wall 52. Further, an upper plate 46u2 is provided at an upper position of the casing member 46. The upper plate 46u2 is fixed to the inner side surface 52b of the partition wall 52 and the partition central wall 54. In the casing member 46, the chamber 56 is formed by closing upper and lower portions. The first straight slit 58a, the second straight slit 58b, and the central straight slit 62 are opened at upper and lower positions.

A rectifier plate 64 extending along the central straight slit 62 is provided at the central straight slit 62, and the rectifier plate 64 has a Y-shape in a front view as viewed in the direction in which the central straight slit 62 extends. The rectifier plate 64 includes an insertion plate 64s inserted into the central straight slit 62, and inclined sections 64a, 64b extending with inclination toward upper left and upper right directions are provided at an upper end of the insertion plate 64s.

By providing the rectifier plate 64, the central straight slit 62 is divided into a first central straight slit 62a and a second central straight slit 62b. As shown in FIGS. 4 and 5, the width a1 of the gaps 50a, 50b between the casing member 46 and the inner wall surfaces 30c, 30d of the casing 30, the width a2 of the slit 58, the width a3 of the first central straight slit 62a and the second central straight slit 62b have the same size (a1=a2=a3).

The gaps 50a, 50b, the first straight slit 58a, the second straight slit 58b, the first central straight slit 62a, and the second central straight slit 62b are in parallel with one another.

Operation of this fuel cell module 10 will be described below.

At the time of starting operation of the fuel cell module 10, air and the raw fuel are supplied to the start-up combustor 26. Specifically, as shown in FIG. 3, for example, a raw fuel such as city gas (containing $CH_4$, $C_2H_6$, $C_3H_8$, $C_4H_{10}$) is supplied to the raw fuel supply chamber 42 through the raw fuel inlet pipe 32, and the raw fuel is filled in the chamber 56.

In the meanwhile, the air flows through the air inlet pipe 34, and the air is filled in the air supply chamber 44. Thus, the air filled in the air supply chamber 44 flows into the slit 58 and the central straight slit 62 formed in the casing member 46, and flows into the gaps 50a, 50b between the casing member 46 and the casing 30.

At this time, the raw fuel filled in the chamber 56 flows through the plurality of raw fuel through holes 60 into the slit 58 (see FIG. 4). Therefore, in the slit 58, a mixed gas of the air and the raw fuel is produced. This mixed gas is ignited by operation of the glow plug 38. Thus, combustion is started, and the combustion gas is produced over the entire slit 58.

Further, the rectifier plate 64 is provided at the central straight slit 62, and the central straight slit 62 is divided into the first central straight slit 62a and the second central straight unit 62b. In the structure, after the air flows into the central straight slit 62, the air is diverged into the first central straight slit 62a and the second central straight slit 62b, and moves upward. Further, by guidance operation of the inclined sections 64a, 64b, the air moves toward the first straight slit 58a and the second straight slit 58b of the slit 58, and the air is supplied to the combustion position.

Further, after the air flows into the gaps 50a, 50b, the air flows from the side surfaces of the casing member 46, and flows around toward the upper portion of the casing member 46. The air flows toward the first straight slit 58a, the second straight slit 58b, and the turning segment 58r, and then, the air is supplied to the combustion position. In the structure, the mixed gas of the raw fuel and the air is obtained over the entire area of the slit 58, and this mixed gas is combusted suitably to produce the combustion gas. The combustion gas is discharged into the combustion gas exhaust pipe 36. The combustion gas is supplied to the combustion gas pipe of the air preheater 24, and the air as the oxygen-containing gas is supplied to the air preheater 24.

In the air preheater 24, the air is heated by heat exchange with the combustion gas. The heated air is supplied to the oxygen-containing gas system (oxygen-containing gas channels) of the fuel cell stack 12. Thus, the temperature of the fuel cell stack 12 is raised by the heated hot air. Further, after the combustion gas is partially consumed as a heat source for heating the reformer 20, and the combustion gas is discharged to the outside. It should be noted that the combustion gas may be used as a heat source for heating the evaporator 28.

When the fuel cell stack 12 and the reformer 20 are heated to preset temperatures, supply of the raw fuel and the air to the start-up combustor 26 is stopped. In the meanwhile, water and the raw fuel are supplied to the evaporator 28. Thus, the water is evaporated, and water vapor is produced. The mixed gas of the water vapor and the raw fuel is supplied into the reformer 20. In the reformer 20, steam reforming of the mixed gas is performed. Hydrogen carbon of $C_{2+}$ is removed (reformed), and a reformed gas chiefly containing methane is obtained.

The reformed gas is supplied to the fuel gas system (fuel gas channels) of the fuel cell stack 12. After the air is heated at the air preheater 24, the heated air is supplied to the oxygen-containing gas system (oxygen-containing gas channels) of the fuel cell stack 12. Thus, in each of the fuel cells 14, electrical energy is produced by chemical reactions of the oxygen and the air.

The fuel gas discharged from the fuel cell stack 12 as the fuel exhaust gas and the oxygen-containing gas discharged from the fuel cell stack 12 as the oxygen-containing exhaust gas flow into the exhaust gas combustor 22. In the exhaust gas combustor 22, the fuel exhaust gas and the oxygen-containing exhaust gas are combusted, and the combustion gas is produced.

In the embodiment of the present invention, as shown in FIG. 3, the air from the air inlet pipe 34 flows toward the slit 58 through the air supply chamber 44. In the meanwhile, the raw fuel from the raw fuel inlet pipe 32 flows toward the slit 58 through the raw fuel supply chamber 42 and the raw fuel through holes 60.

Thus, the air and the raw fuel can be guided reliably to the slit 58 which is arranged at the desired position for combustion. The combustion gas can be produced suitably by ignition using the glow plug 38. Accordingly, with the compact structure, the start-up combustor 26 (i.e., the fuel cell module 10) can obtain the stable combustion gas promptly and reliably.

Further, as shown in FIGS. 5 and 6, the slit 58 includes the first straight slit 58a, the second straight slit 58b, and the one turning segment 58r. In this regard, the raw fuel through holes 60 are provided oppositely on both sides of the turning segment 58r, oppositely on both sides of the first straight slit 58a, and oppositely on both sides of the second straight slit 58b.

Thus, the stable combustion gas can be obtained reliably within the entire slit 58. It becomes possible to reduce the overall size of the start-up combustor 26 easily. Moreover, the slit 58 includes the turning segment 58r to have the first straight slit 58a and the second straight slit 58b. Accordingly, it is possible to easily simplify the structure, and achieve size reduction.

Further, the raw fuel supply chamber 42 has the casing member 46 provided in the casing 30. In this regard, the casing member 46 is provided between the inner wall surfaces 30c, 30d of the casing 30 with the gaps 50a, 50b. Further, the pair of holder plates 48 is fixed to the bottom surface 46t of the casing member 46 in the state where the casing member 46 is spaced from the bottom surface 30t of the casing 30.

In the structure, the raw fuel supply chamber 42 which is a combustion area having a relatively high temperature and the casing 30 formed by outer plates having a relatively low temperature are connected only by the pair of holder plates 48. Thus, thermal deformation occurs in the casing member 46 and the casing 30 individually. It is possible to effectively suppress generation of large heat stresses between the casing member 46 and the casing 30, and it becomes possible to prevent damage of components.

Moreover, the raw fuel supply chamber 42 has the central straight slit 62 inside the slit 58. This central straight slits 62 is provided at the intermediate position between the first straight slit 58a and the second straight slit 58b as straight segments of the slit 58, and extends straight in parallel with the first straight slit 58a and the second straight slit 58b. Therefore, after the air flows from the central straight slit 62 into the raw fuel supply chamber 42, the air is supplied to the first straight slit 58a and the second straight slit 58b. Thus, production of the combustion gas is further facilitated.

Further, the rectifier plate 64 extending along the central straight slit 62 is provided in the central straight slit 62, and the rectifier plate 64 has the Y-shape in the front view as viewed in the direction in which the central straight slit 62 extends. Thus, it is possible to smoothly and uniformly supply the air to the first straight slit 58a and the second straight slit 58b provided on both sides of the rectifier plate 64. Accordingly, production of the stable combustion gas is performed further reliably.

Further, the rectifier plate 64 is provided at the central straight slit 62 to divide the central straight slit 62 into the first central straight slit 62a and the second central straight slit 62b. In this regard, the width a1 of the gaps 50a, 50b between the casing member 46 and the inner wall surfaces 30c, 30d of the casing 30, the width a2 of the slit 58, the width a3 of the first central straight slit 62a and the second central straight slit 62b have the same size.

Thus, uniform and suitable combustion is performed within the entire slit 58. With the compact structure, stable premixed combustion is performed promptly. Premixed combustion herein means combustion performed by supplying the raw fuel and the air separately and mixing the raw fuel and the air at the slit 58 as a nozzle or a burner.

Further, the gaps 50a, 50b, the first straight slit 58a, the second straight slit 58b, the first central straight slit 62a, and the second central straight slit 62b extend in parallel with one another. Thus, with compact and simple structure, it becomes possible to perform suitable combustion.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell combustor configured to supply a combustion gas produced by mixing a fuel gas and an oxygen-containing gas, to a fuel cell stack including a plurality of stacked fuel cells configured to generate electrical energy by electrochemical reactions of the fuel gas and the oxygen-containing gas, the combustor comprising a casing,
the casing having:
a fuel gas inlet configured to flow the fuel gas into the casing through the fuel gas inlet;
an oxygen-containing gas inlet configured to flow the oxygen-containing gas into the casing through the oxygen-containing gas inlet;
a combustion gas outlet configured to discharge the combustion gas from the casing through the combustion gas outlet;
a fuel gas supply unit connected to the fuel gas inlet and configured to fill the fuel gas in the fuel gas supply unit; and
an oxygen-containing gas supply unit connected to the oxygen-containing gas inlet and configured to fill the oxygen-containing gas in the oxygen-containing gas supply unit, the fuel gas supply unit and the oxygen-containing gas supply unit forming a double layer structure,
wherein the fuel gas supply unit is a chamber having a partition wall;
a slit connected to the oxygen-containing gas supply unit is formed in the partition wall, wherein the slit includes a first straight slit, a second straight slit, and at least one turning segment;
a plurality of fuel gas through holes are formed oppositely on each side surface of the partition wall with which the slit is formed, the fuel gas through holes are configured to pass the fuel gas from the chamber to the slit, and the fuel gas through holes are arranged in a direction in which the slit extends, wherein the fuel pas through holes are provided oppositely on each side surface of the partition plate in the turning segment, the first straight slit, and the second straight slit; and
the oxygen-containing gas flows through the oxygen-containing gas inlet, the oxygen-containing gas supply unit, and the slit, and the oxygen-containing gas is mixed with the fuel gas.

2. A fuel cell module comprising:
a fuel cell stack including a plurality of stacked fuel cells configured to generate electrical energy by electrochemical reactions of a fuel gas and an oxygen-containing gas; and a combustor configured to supply a combustion gas produced by mixing the fuel gas and the oxygen-containing gas, to the fuel cell stack,
the combustor having a casing,
the casing having:
a fuel gas inlet configured to flow the fuel gas into the casing through the fuel gas inlet;
an oxygen-containing gas inlet configured to flow the oxygen-containing gas into the casing through the oxygen-containing gas inlet;
a combustion gas outlet configured to discharge the combustion gas from the casing through the combustion gas outlet;
a fuel gas supply unit connected to the fuel gas inlet and configured to fill the fuel gas in the fuel gas supply unit; and
an oxygen-containing gas supply unit connected to the oxygen-containing gas inlet and configured to fill the oxygen-containing gas in the oxygen-containing gas supply unit, the fuel gas supply unit and the oxygen-containing gas supply unit forming a double layer structure,
wherein the fuel gas supply unit is a chamber having a partition wall;
a slit connected to the oxygen-containing gas supply unit is formed in the partition wall, wherein the slit includes a first straight slit, a second straight slit, and at least one turning segment;
a plurality of fuel gas through holes are formed oppositely on each side surface of the partition wall with which the slit is formed, the fuel gas through holes are configured to pass the fuel gas from the chamber to the slit, and the fuel gas through holes are arranged in a direction in which the slit extends, wherein the fuel gas through holes are provided oppositely on each side surface of the partition plate in the turning segment, the first straight slit, and the second straight slit; and
the oxygen-containing gas flows through the oxygen-containing gas inlet, the oxygen-containing gas supply unit, and the slit, and the oxygen-containing gas is mixed with the fuel gas.

3. A fuel cell module comprising:
a fuel cell stack including a plurality of stacked fuel cells configured to generate electrical energy by electrochemical reactions of a fuel gas and an oxygen-containing gas; and
a combustor configured to supply a combustion gas produced by mixing the fuel gas and the oxygen-containing gas, to the fuel cell stack,
the combustor having a casing,
the casing having:
a fuel gas inlet configured to flow the fuel gas into the casing through the fuel pas inlet;
an oxygen-containing gas inlet configured to flow the oxygen-containing gas into the casing through the oxygen-containing gas inlet;
a combustion gas outlet configured to discharge the combustion gas from the casing through the combustion gas outlet;
a fuel gas supply unit connected to the fuel gas inlet and configured to fill the fuel gas in the fuel gas supply unit; and
an oxygen-containing gas supply unit connected to the oxygen-containing gas inlet and configured to fill the oxygen-containing gas in the oxygen-containing gas supply unit, the fuel gas supply unit and the oxygen-containing gas supply unit forming a double layer structure,
wherein the fuel gas supply unit is a chamber having a partition wall;
a slit connected to the oxygen-containing gas supply unit is formed in the partition wall;
a plurality of fuel gas through holes are formed on a side surface of the partition wall with which the slit is formed, the fuel gas through holes are configured to pass the fuel gas from the chamber to the slit, and the fuel gas through holes are arranged in a direction in which the slit extends; and
the oxygen-containing gas flows through the oxygen-containing gas inlet, the oxygen-containing gas supply unit, and the slit, and the oxygen-containing gas is mixed with the fuel gas,
wherein the fuel gas supply unit includes a casing member provided in the casing;
a gap is formed between the casing member and an inner wall surface of the casing; and
a holder plate is fixed to one surface of the casing member, and is configured to hold the casing member by another inner wall surface of the casing which is different from the inner wall surface.

4. The fuel cell module according to claim 3, wherein the fuel gas supply unit has a central straight slit inside the slit, the central straight slit extends straight in parallel with a straight segment of the slit, and the central straight slit is spaced from the slit.

5. The fuel cell module according to claim 4, wherein a rectifier plate is provided at the central straight slit, and the rectifier plate extends along the central straight slit; and
the rectifier plate has a Y-shape in a front view as viewed from a direction in which the central straight slit extends.

6. The fuel cell module according to claim 5, wherein the rectifier plate is provided at the central straight slit to divide the central straight slit into a first central straight slit and a second central straight slit; and
a width of a gap between the casing member and the inner wall surface of the casing, a width of the slit, a width of the first central straight slit, and a width of the second central straight slit have the same size.

7. The fuel cell module according to claim 6, wherein the gap, the straight segment of the slit, the first central straight slit, and the second central straight slit extend in parallel with one another.

* * * * *